United States Patent
Watanabe et al.

(10) Patent No.: US 10,974,625 B2
(45) Date of Patent: Apr. 13, 2021

(54) VEHICLE SEAT

(71) Applicant: TOYOTA BOSHOKU KABUSHIKI KAISHA, Aichi-ken (JP)

(72) Inventors: Hirofumi Watanabe, Aichi-ken (JP); Hiroshi Mizobata, Aichi-ken (JP); Yasuhiro Kato, Aichi-ken (JP)

(73) Assignee: TOYOTA BOSHOKU KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 16/415,685

(22) Filed: May 17, 2019

(65) Prior Publication Data
US 2019/0359095 A1 Nov. 28, 2019

(30) Foreign Application Priority Data
May 22, 2018 (JP) .............................. JP2018-097774

(51) Int. Cl.
*B60N 2/22* (2006.01)
*B60N 2/20* (2006.01)
*B60N 2/235* (2006.01)
*B60N 2/42* (2006.01)
*B60N 2/68* (2006.01)

(52) U.S. Cl.
CPC ............. *B60N 2/4249* (2013.01); *B60N 2/20* (2013.01); *B60N 2/4228* (2013.01); *B60N 2/686* (2013.01)

(58) Field of Classification Search
CPC . B60N 2/99; B60N 2/986; B60N 2/22; B60N 2/20
See application file for complete search history.

(56) References Cited

U.S. PATENT DOCUMENTS

| | | | |
|---|---|---|---|
| 6,375,267 B1* | 4/2002 | Ishikawa | B60N 2/68 297/452.18 |
| 7,131,697 B2* | 11/2006 | Beermann | B60N 2/22 297/354.12 |
| 10,118,513 B2* | 11/2018 | Fujita | B60N 2/68 |
| 10,427,570 B2* | 10/2019 | Haby | B60N 2/20 |
| 10,449,875 B2* | 10/2019 | Takiya | B60N 2/2227 |
| 10,464,448 B2* | 11/2019 | Takiya | B60N 2/20 |
| 10,543,760 B2* | 1/2020 | Yamabe | B60N 2/688 |
| 10,569,680 B2* | 2/2020 | Rasello | B60N 2/42 |

(Continued)

FOREIGN PATENT DOCUMENTS

JP 2007-506598 3/2007

*Primary Examiner* — Shin H Kim
(74) *Attorney, Agent, or Firm* — Greenblum & Bernstein, P.L.C.

(57) ABSTRACT

A vehicle seat includes a back frame mounted on a cushion frame via a recliner in a pivotally movable manner. The back frame has a support member connected to the recliner, and a seat back shell supported by the support member. The support member has a side plate portion and a rear plate portion facing a side surface and a rear surface of the seat back shell, respectively, and the side plate portion has a base portion fixed to the recliner, and an extension portion provided to extend more upward than the base portion. The side plate portion is fixed at the extension portion to the side surface of the seat back shell, and the rear plate portion is at least fixed in a region to the rear surface of the seat back shell, the region provided to rise from a lower position of the side plate portion.

7 Claims, 8 Drawing Sheets

(56) References Cited

U.S. PATENT DOCUMENTS

| | | | |
|---|---|---|---|
| 2003/0116999 A1* | 6/2003 | Fujita | B60N 2/42736 |
| | | | 297/216.13 |
| 2006/0076816 A1* | 4/2006 | Fujita | B60N 2/22 |
| | | | 297/362.12 |
| 2006/0082208 A1 | 4/2006 | Beermann et al. | |
| 2013/0249267 A1* | 9/2013 | Hosokawa | B60N 2/682 |
| | | | 297/354.1 |
| 2016/0207425 A1* | 7/2016 | Kaneko | B60N 2/20 |
| 2017/0080832 A1* | 3/2017 | Fujita | B60N 2/2231 |
| 2018/0257517 A1* | 9/2018 | Takiya | B60N 2/2227 |
| 2018/0257518 A1* | 9/2018 | Takiya | B60N 2/20 |
| 2018/0319301 A1* | 11/2018 | Haby | B60N 2/6009 |
| 2018/0334060 A1* | 11/2018 | Yamabe | B60N 2/4221 |
| 2019/0135149 A1* | 5/2019 | Zhang | B60N 2/0248 |
| 2019/0152353 A1* | 5/2019 | Fujita | B60N 2/42745 |
| 2019/0152364 A1* | 5/2019 | Kawauchi | B60N 2/68 |
| 2019/0160978 A1* | 5/2019 | Arashi | B60N 2/20 |
| 2019/0168637 A1* | 6/2019 | Abe | B60N 2/06 |
| 2019/0176673 A1* | 6/2019 | Patel | B60N 2/885 |
| 2019/0184866 A1* | 6/2019 | Tamaki | B60N 2/20 |
| 2019/0217757 A1* | 7/2019 | Kato | B60N 2/20 |
| 2019/0359095 A1* | 11/2019 | Watanabe | B60N 2/4228 |
| 2020/0039408 A1* | 2/2020 | Donovan | B60N 2/90 |
| 2020/0156506 A1* | 5/2020 | Goto | B60N 2/20 |

* cited by examiner

VEHICLE SEAT

This nonprovisional application is based on Japanese Patent Application No. 2018-097774 filed on May 22, 2018 with the Japan Patent Office, the entire contents of which are hereby incorporated by reference.

BACKGROUND

Field

The present disclosure relates to vehicle seats, and more particularly to a vehicle seat installed in a vehicle such as an automobile.

Description of the Background Art

A seat back commonly referred to as a shell type seat back is known as a seat back provided for a vehicle seat. In the shell type seat back, a back frame forming its framework is formed of a thin plate-like seat back shell made of a composite resin material, a metal material or the like. As a result, an improved fit is provided when an occupant rests its back against the seat back as compared to a seat back having a common configuration.

Japanese National Patent Publication No. 2007-506598, for example, discloses a vehicle seat including this type of seat back. In the vehicle seat disclosed in this publication, a seat back shell is supported by a pair of right and left plate-like support members fixed to the rear ends of a cushion frame via a recliner. Here, the pair of plate-like members is usually formed of a metallic member.

SUMMARY

Generally, when a vehicle seat including the shell type seat back is subjected to a high load such as during a rear collision, the pair of right and left plate-like support members described above may be irreversibly deformed (namely, plastically deformed). This deformation often occurs when the paired support members disposed to face each other in a seat width direction experience buckling, causing the lower ends of the paired support members to be displaced in directions away from each other. As a result, breakage may occur at joints between the recliner and the paired support members.

For this reason, conventionally, a metallic reinforcing member coupling the paired support members together is provided as a bridge along the seat width direction, or the thickness of the paired support members themselves is substantially increased, to thereby suppress the deformation of the paired support members. Employing these configurations, however, inevitably increases the weight of the vehicle seat, resulting in failure to achieve weight reduction of the vehicle seat.

Accordingly, the present disclosure has been made to solve the problem described above, and aims to provide a vehicle seat in which a support member supporting a seat back shell is less likely to be deformed and which achieves weight reduction.

A vehicle seat based on one aspect of the present disclosure includes: a cushion frame forming a framework of a seat cushion; a back frame forming a framework of a seat back; and a recliner configured to couple the cushion frame and the back frame in such a manner as to allow pivotal movement of the back frame. The back frame has a support member connected to the recliner, and a seat back shell supported by the support member. The support member has a side plate portion facing a side surface of the seat back shell, and a rear plate portion facing a rear surface of the seat back shell. The side plate portion has a base portion fixed to and covered by the recliner, and an extension portion provided to extend more upward than the base portion along a seat upward-downward direction. The side plate portion is fixed at the extension portion to the side surface of the seat back shell, and the rear plate portion is at least fixed in a region to the rear surface of the seat back shell, the region provided to rise inward along a seat width direction from a lower position of the side plate portion in the seat upward-downward direction.

The foregoing and other objects, features, aspects and advantages of the present disclosure will become more apparent from the following detailed description of the present disclosure when taken in conjunction with the accompanying drawings.

DESCRIPTION OF THE PREFERRED EMBODIMENTS

Figure 1:
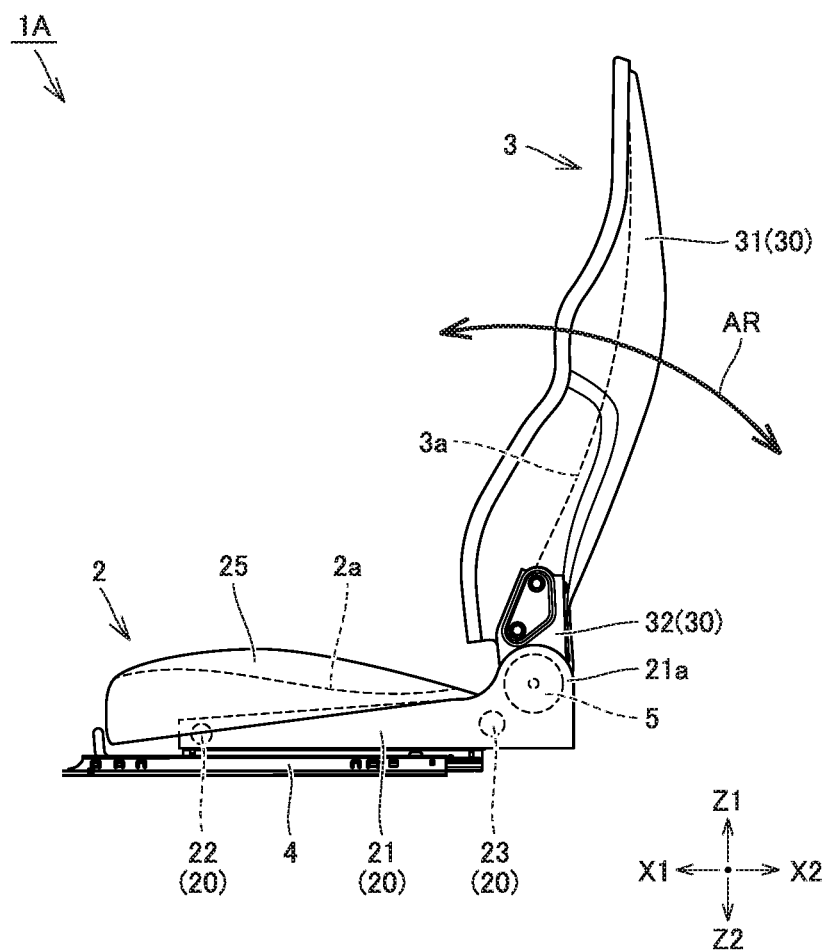
FIG. 1 is a schematic side view of a vehicle seat according to a first embodiment.

Embodiments are described in detail below with reference to the drawings. The following embodiments illustrate examples where characteristic configurations of the present disclosure are applied to a vehicle seat configured as an automobile seat. In the following embodiments, the same or corresponding parts are designated by the same symbols in the drawings and description thereof will not be repeated.

In each of the figures (except FIGS. 5 to 9), as viewed by an occupant seated on the vehicle seat, a seat forward direction and a seat rearward direction are indicated by an X1 direction and an X2 direction, respectively; a seat leftward direction and a seat rightward direction are indicated by a Y1 direction and a Y2 direction, respectively; and a seat upward direction and a seat downward direction are indicated by a Z1 direction and a Z2 direction, respectively. In the following description, an axis coinciding with seat forward direction X1 and seat rearward direction X2 is referred to as an X axis; an axis coinciding with seat leftward direction Y1 and seat rightward direction Y2 is referred to as a Y axis; and an axis coinciding with seat upward direction Z1 and seat downward direction Z2 is referred to as a Z axis.

First Embodiment

Figure 2:
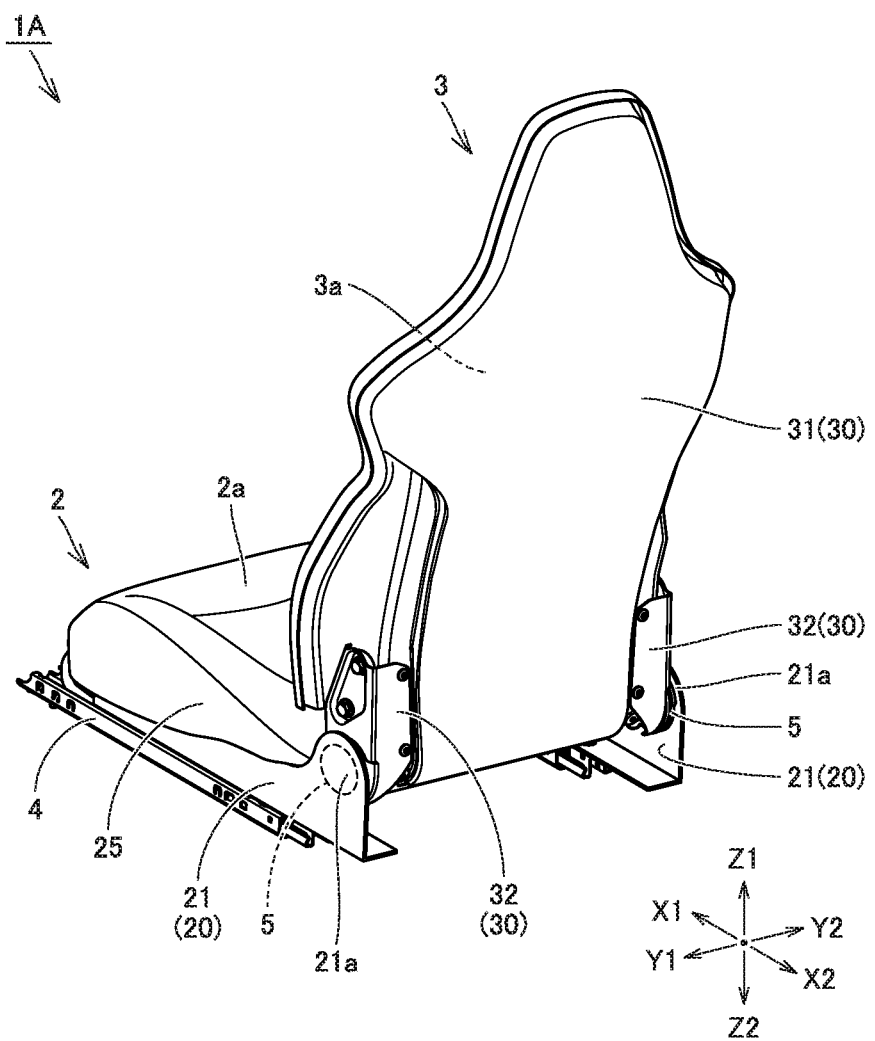
FIG. 2 is a schematic perspective view of the vehicle seat according to the first embodiment.

FIGS. 1 and 2 are a schematic side view and a schematic perspective view of a vehicle seat according to a first embodiment, respectively. First, a schematic configuration of a vehicle seat 1A according to the present embodiment is described with reference to FIGS. 1 and 2.

As shown in FIGS. 1 and 2, vehicle seat 1A is installed on the vehicle's floor via a sliding mechanism 4, for example. Vehicle seat 1A mainly includes a seat cushion 2, a seat back 3, and a recliner 5.

Seat cushion 2 has a sitting surface 2a on its upper surface, on which the occupant can sit. Seat cushion 2 is disposed such that sitting surface 2a is substantially parallel to the vehicle's floor. Seat back 3 has a backrest surface 3a on its front surface, against which the occupant can rest its back. Seat back 3 is disposed to rise from the rear end of seat cushion 2.

Seat cushion 2 has a cushion frame 20, a cushion pad 25 covering cushion frame 20, and a cushion cover (not shown) covering cushion pad 25. Cushion pad 25 is for elastically supporting the occupant, and sitting surface 2a described above is defined by the cushion cover as an exterior material.

Cushion frame 20 forms a framework of seat cushion 2, and has side frames 21 as a pair of right and left frames, and a front pipe 22 (see FIG. 1) and a rear pipe 23 (see FIG. 1) as a pair of front and back frames.

Each of paired side frames 21 is formed of a press-molded component made by pressing a metal plate such as a steel plate, and is disposed to extend along a seat forward-rearward direction (namely, the X axis direction). Each of front pipe 22 and rear pipe 23 is formed of a metallic cylindrical member such as a steel pipe, and is disposed to extend along a seat width direction (namely, the Y axis direction). Front pipe 22 couples the front ends of paired side frames 21 to each other, and rear pipe 23 couples the rear ends of side frames 21 to each other.

Seat back 3 has a back frame 30, a back pad (not shown) covering back frame 30, and a back cover (not shown) covering the back pad. The back pad is for elastically supporting the occupant, and backrest surface 3a described above is defined by the back cover as an exterior material.

Back frame 30 forms a framework of seat back 3, and has a seat back shell 31, and upper arms 32 serving as support members which are a pair of right and left brackets.

Seat back shell 31 is formed of a thin plate-like member made of a composite resin material, a metal material or the like. Seat back shell 31 is configured such that its backrest surface 3a has a concave surface shape as a whole, so as to have a shape adapted to the contour of the back of the occupant, to thereby provide an improved fit when the occupant rests its back against backrest surface 3a.

Here, when seat back shell 31 is made of a composite resin material, a fiber-reinforced composite resin material is suitably used. As the fiber-reinforced composite resin material, so-called CFRP (Carbon Fiber Reinforced Plastic), GFRP (Glass Fiber Reinforced Plastic) or the like can be utilized, in which a textile, a fabric or a non-woven fabric made of carbon fiber, glass fiber or the like is used as a reinforcing material, for example, and in which a thermosetting resin such as an epoxy resin, a phenolic resin or an unsaturated polyester resin, or a thermoplastic resin such as a polypropylene resin or a polyamide resin is used as a matrix resin covering the reinforcing material.

When seat back shell 31 is made of a metal material, on the other hand, seat back shell 31 is preferably made of steel, aluminum, an aluminum alloy, magnesium, a magnesium alloy or the like.

Paired upper arms 32 are located near the lower end of seat back shell 31 in the upward-downward direction, at opposite ends of seat back shell 31 in the seat width direction. Each of paired upper arms 32 is fixed to seat back shell 31, to thereby support seat back shell 31.

Each of paired upper arms 32 is formed of a press-molded component made by pressing a metal plate, for example, and is suitably made of steel, aluminum, an aluminum alloy, magnesium, a magnesium alloy or the like. Each of paired upper arms 32 is substantially L shaped in cross section, and is fixed to seat back shell 31 while placed over a side surface and a rear surface of seat back shell 31.

Each of paired side frames 21 of cushion frame 20 is provided at its rear end with a lower arm portion 21a. These paired lower arm portions 21a are disposed to face paired upper arms 32 in the seat width direction, respectively, and recliner 5 is mounted between each of paired lower arm portions 21a and each of paired upper arms 32.

More specifically, lower arm portion 21a is disposed on the outer side relative to upper arm 32 in the seat width direction. Thus, an outer surface of recliner 5 in the seat width direction is fixed to an inner surface of lower arm portion 21a in the seat width direction, and an inner surface of recliner 5 in the seat width direction is fixed to an outer surface of upper arm 32 in the seat width direction. The fixation between lower arm portion 21a and recliner 5 and between upper arm 32 and recliner 5 is performed by welding or the like, for example.

As a result, seat back 3 is configured to pivotally move in a direction of an arrow AR shown in FIG. 1 around the position where recliner 5 is provided. Thus, the angle of the backrest of seat back 3 can be adjusted to an arbitrary angle by operation of a lever or the like (not shown).

Figure 3:
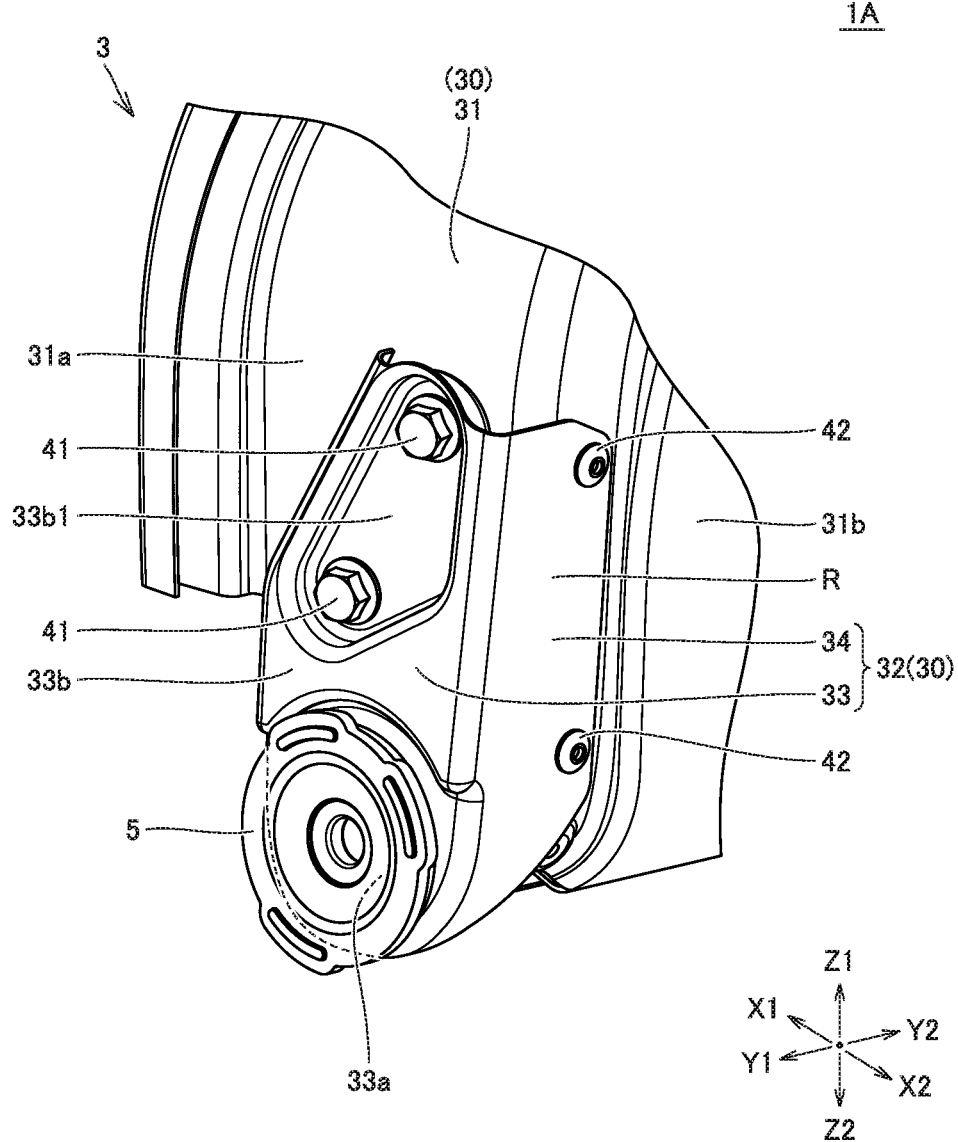
FIG. 3 is a schematic perspective view in the vicinity of an upper arm of the vehicle seat according to the first embodiment.
Figure 4:
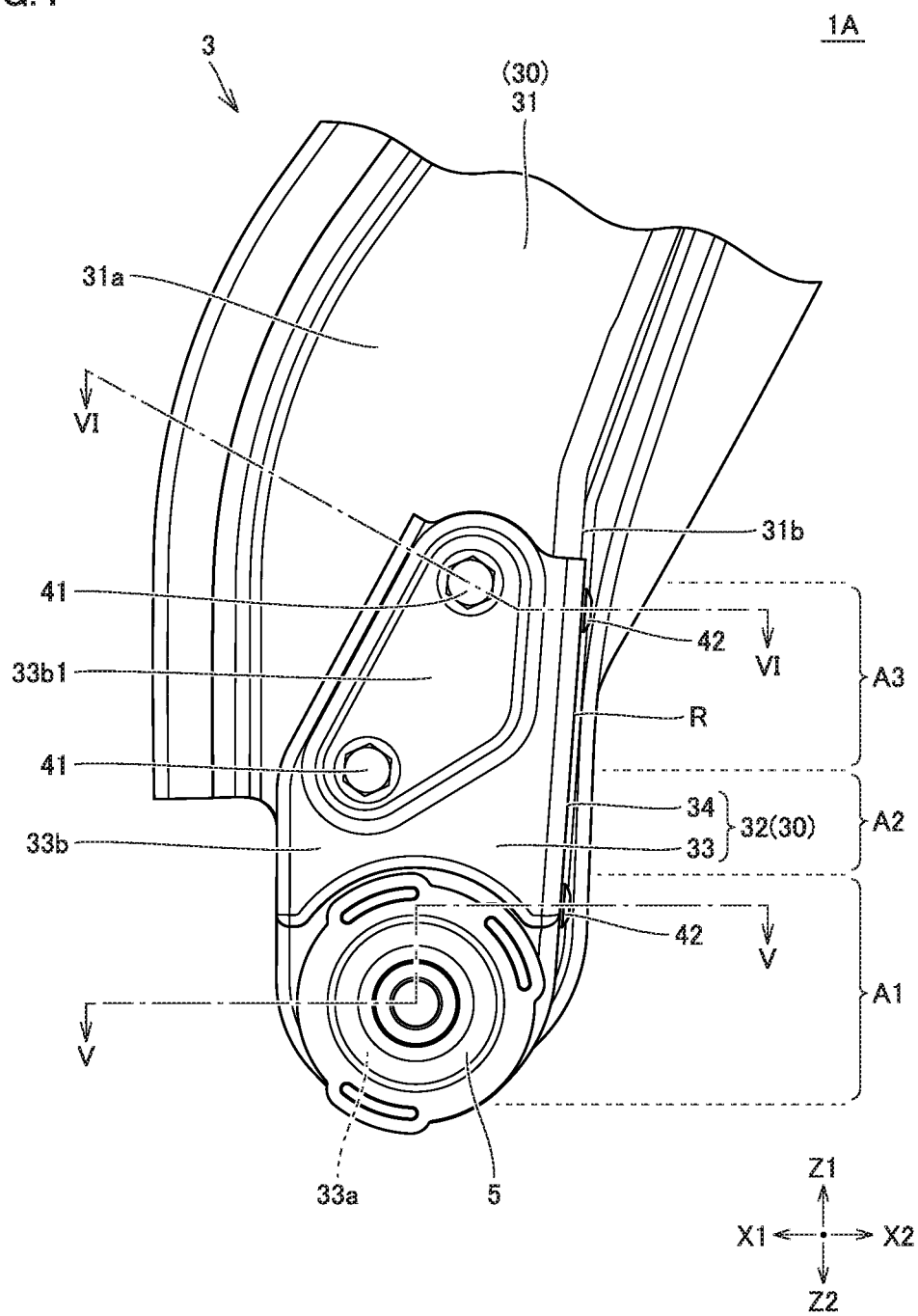
FIG. 4 is a schematic side view in the vicinity of the upper arm of the vehicle seat according to the first embodiment.
Figure 5:
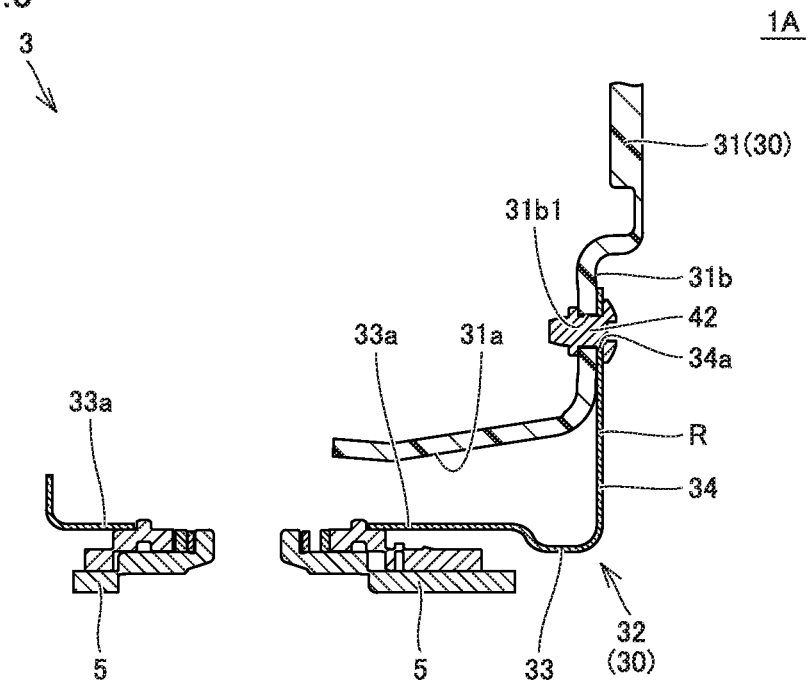
FIG. 5 is a schematic sectional view taken along the line V-V shown in FIG. 4.
Figure 6:
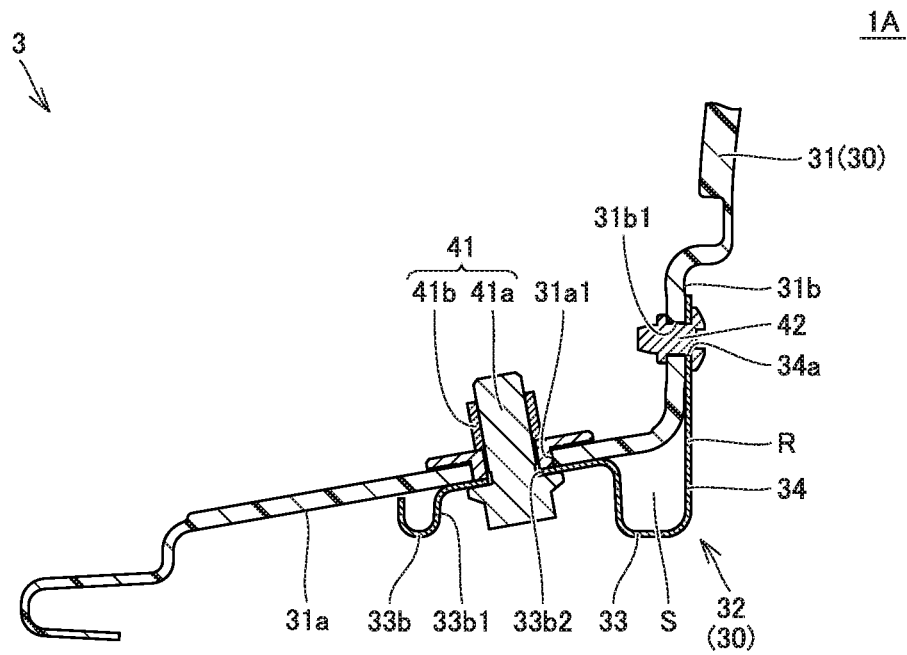
FIG. 6 is a schematic sectional view taken along the line VI-VI shown in FIG. 4.

FIGS. 3 and 4 are a schematic perspective view and a schematic side view in the vicinity of the upper arm of the vehicle seat according to the first embodiment, respectively. FIGS. 5 and 6 are schematic sectional views taken along the lines V-V and VI-VI shown in FIG. 4, respectively. Next, the configuration in the vicinity of upper arm 32 in vehicle seat 1A according to the present embodiment is described in detail with reference to FIGS. 3 to 6.

As described above, seat back 3 is provided with the pair of right and left upper arms 32 in vehicle seat 1A according to the present embodiment. These paired right and left upper arms 32 and the configurations in the vicinity thereof are basically mirror-symmetrical in the seat width direction (namely, the Y axis direction). Thus, the following focuses on and describes the configuration in the vicinity of the upper arm located on the left side of seat back 3 in the seat width direction.

As shown in FIGS. 3 to 6, seat back shell 31 has a side surface 31a located to cross the seat width direction (namely, the Y axis direction), and a rear surface 31b located to cross the seat forward-rearward direction (namely, the X axis direction). These side surface 31a and rear surface 31b are provided to be continuous with each other via an edge portion.

Upper arm 32 has a side plate portion 33 facing side surface 31a of seat back shell 31, and a rear plate portion 34 facing rear surface 31b of seat back shell 31. These side plate portion 33 and rear plate portion 34 are provided to be continuous with each other via an edge portion. More specifically, rear plate portion 34 is provided to rise inward along the seat width direction (namely, the Y axis direction) from the rear end of side plate portion 33. In the present embodiment, rear plate portion 34 is provided to rise from the entire rear end of side plate portion 33.

As shown in FIGS. 3 and 4, side plate portion 33 of upper arm 32 has a base portion 33a fixed to and covered by recliner 5, and an extension portion 33b provided to extend more upward than base portion 33a along the seat upward-downward direction (namely, the Z axis direction). In the present embodiment, a step portion is provided between base portion 33a and extension portion 33b such that extension portion 33b is located on the outer side relative to base portion 33a in the seat width direction (namely, the Y axis direction).

As shown in FIGS. 3, 4 and 6, side plate portion 33 is fixed at its extension portion 33b to side surface 31a of seat back shell 31. Here, in the present embodiment, extension portion 33b is fixed by first fastening members 41 each formed of a bolt 41a and a nut 41b.

More specifically, extension portion 33b is provided with an abutment portion 33b1 formed as a concave portion having a prescribed shape, and the bottom of abutment portion 33b1 is provided with two holes 33b2 (one of which appears in FIG. 6) at prescribed positions. On the other hand, side surface 31a of seat back shell 31 is provided with two holes 31a1 (one of which appears in FIG. 6) so as to extend through seat back shell 31.

The fixation of side plate portion 33 of upper arm 32 to side surface 31a of seat back shell 31 by means of first fastening members 41 is performed by placing side plate portion 33 of upper arm 32 over side surface 31a of seat back shell 31 such that two holes 31a1 provided in seat back shell 31 overlap with two holes 33b2 provided in side plate portion 33 of upper arm 32, respectively, and by inserting bolts 41a into these holes 31a1 and 33b2 in this state which causes nuts 41b to be screwed onto the tips of bolts 41a.

As shown in FIGS. 3 and 4, rear plate portion 34 of upper arm 32 is provided to rise from the entire rear end of side plate portion 33, and rear plate portion 34 has a region R provided to rise from a lower position of the rear end of side plate portion 33 of upper arm 32. Here, region R is a region of rear plate portion 34 that is included in a range represented by symbols A1 to A3 in FIG. 4. More specifically, region R is a region of rear plate portion 34 that is included in a range from a portion corresponding to the uppermost position in the seat upward-downward direction (namely, the Z axis direction) of the fixed positions of extension portion 33b of upper arm 32 to side surface 31a of seat back shell 31, to a portion corresponding to the lowermost position in the seat upward-downward direction of base portion 33a of upper arm 32 covered by recliner 5.

As shown in FIGS. 3 to 6, rear plate portion 34 is fixed in region R to rear surface 31b of seat back shell 31. Here, in the present embodiment, the portion of rear plate portion 34 that corresponds to region R is fixed by second fastening members 42 formed of rivets.

More specifically, region R of rear plate portion 34 is provided with two holes 34a (one of which appears in FIG. 5 and the other appears in FIG. 6) at prescribed positions. On the other hand, rear surface 31b of seat back shell 31 is provided with two holes 31b1 (one of which appears in FIG. 5 and the other appears in FIG. 6) so as to extend through seat back shell 31.

The fixation of rear plate portion 34 of upper arm 32 to rear surface 31b of seat back shell 31 by means of second fastening members 42 is performed by placing rear plate portion 34 of upper arm 32 over rear surface 31b of seat back shell 31 such that two holes 31b1 provided in seat back shell 31 overlap with two holes 34a provided in rear plate portion 34 of upper arm 32, respectively, and by the inserting the rivets into these holes 31b1 and 34a in this state which causes the tips of the rivets to be deformed.

A summary of the characteristic configuration in the vicinity of upper arm 32 described above is given as follows.

Upper arm 32 has side plate portion 33 facing side surface 31a of seat back shell 31, and rear plate portion 34 facing rear surface 31b of seat back shell 31. Side plate portion 33 has base portion 33a fixed to and covered by recliner 5, and extension portion 33b provided to extend more upward than base portion 33a along the seat upward-downward direction (namely, the Z axis direction). Side plate portion 33 is fixed at extension portion 33b to side surface 31a of seat back shell 31, and rear plate portion 34 is at least fixed in region R to rear surface 31b of seat back shell 31, region R provided to rise inward along the seat width direction (namely, the Y axis direction) from the lower position of side plate portion 33 in the seat upward-downward direction.

With such a configuration, seat back shell 31 is supported at both side plate portion 33 and rear plate portion 34 of upper arm 32 provided to cross each other. As a result, the portion of seat back shell 31 that is supported by upper arm 32 (namely, the portion of seat back shell 31 that is covered by upper arm 32; in other words, the portion near the lower end of seat back shell 31 in the seat upward-downward direction, at each of the opposite ends of seat back shell 31 in the seat width direction) functions as a strength retaining portion.

In addition, with such a configuration, the fixed position of upper arm 32 to recliner 5 (namely, base portion 33a of side plate portion 33 of upper arm 32) and the fixed position of upper arm 32 to seat back shell 31 (namely, region R of rear plate portion 34 of upper arm 32) are disposed in proximity to each other. As a result, when an external load is applied, the distance over which recliner 5 and seat back shell 31 coupled to each other via upper arm 32 can move relative to each other can be physically reduced.

Thus, a combination of these configurations can lead to substantial suppression of the deformation of upper arm 32 even when an external load is applied, thereby eliminating the need to provide upper arm 32 with a separate reinforcing member or to increase the thickness of upper arm 32. Therefore, by employing vehicle seat 1A according to the present embodiment, a vehicle seat which is less likely to be deformed and which achieves weight reduction can be achieved.

Here, referring to FIG. 4, in the present embodiment, of the ranges indicated by symbols A1 to A3 shown in the figure, respectively, the range indicated by symbol A1 and the range indicated by symbol A3 are each provided with one of the fixed positions of rear plate portion 34 of upper arm 32 to rear surface 31b of seat back shell 31 by means of second fastening members 42.

The range indicated by symbol A1 is a range of height positions corresponding to base portion 33a of upper arm 32 covered by recliner 5. The range indicated by symbol A2 is a range between the lowermost position of the fixed positions of extension portion 33b of upper arm 32 to side surface 31a of seat back shell 31 and the uppermost position of the height positions corresponding to base portion 33a of upper arm 32 covered by recliner 5. The range indicated by symbol A3 is a range between the uppermost position of the fixed positions of extension portion 33b of upper arm 32 to side surface 31a of seat back shell 31 and the lowermost position of the fixed positions of extension portion 33b of upper arm 32 to side surface 31a of seat back shell 31.

The fixation by means of second fastening member 42 provided within the range indicated by symbol A1 is mainly for physically reducing the distance over which recliner 5 and seat back shell 31 coupled to each other via upper arm 32 can move relative to each other when an external load is applied. On the other hand, the fixation by means of second fastening member 42 provided within the range indicated by symbol A3 is mainly for maintaining the shape of upper arm 32 which is substantially L shaped in cross section, so that high rigidity can be ensured even when the external dimensions of upper arm 32 in the seat upward-downward direction (namely, the Z axis direction) are reduced.

However, the fixation by means of second fastening member 42 provided within the range indicated by symbol A1 is also for maintaining the shape of upper arm 32 which is substantially L shaped in cross section, and the fixation by means of second fastening member 42 provided within the range indicated by symbol A3 is also for physically reducing the distance over which recliner 5 and seat back shell 31 coupled to each other via upper arm 32 can move relative to each other when an external load is applied.

In this manner, the fixation of rear plate portion 34 of upper arm 32 to rear surface 31b of seat back shell 31 is only required to be performed at least in region R, and the number and positions thereof are not particularly limited. For example, the fixation of rear plate portion 34 of upper arm 32 to rear surface 31b of seat back shell 31 by means of second fastening member 42 may be performed only within the range indicated by symbol A1, only within the range indicated by symbol A3, or only within the range indicated by symbol A2.

That is, the fixation of rear plate portion 34 of upper arm 32 to rear surface 31b of seat back shell 31 is only required to be performed at least one or more locations within the ranges indicated by symbols A1 to A3. Alternatively, the fixation may be provided at one or more locations or two or more locations as a whole such that the fixation is performed at least one or more locations within the ranges indicated by symbols A1 and A2. Still alternatively, the fixation may be provided at one or more locations or two or more locations as a whole such that the fixation is performed at at least one or more locations within the range indicated by symbol A1.

In terms of physically reducing the distance between the fixed position of upper arm 32 to recliner 5 and the fixed position of upper arm 32 to seat back shell 31 to thereby suppress the deformation of upper arm 32 when an external load is applied, it is sufficient for the fixation of rear plate portion 34 of upper arm 32 to rear surface 31b of seat back shell 31 to be at least performed within the ranges of symbols A1 to A3, and it is more preferable for the fixation to be at least performed within the ranges of symbols A1 and A2, and further preferable for the fixation to be at least performed within the range of symbol A1.

Referring to FIG. 6, on the other hand, in the present embodiment, since side plate portion 33 of upper arm 32 is provided with abutment portion 33b1, a hollow portion S extending along the seat upward-downward direction (namely, the Z axis direction) is provided between seat back shell 31 and upper arm 32. Hollow portion S is located to face the portion connecting side surface 31a and rear surface 31b of seat back shell 31 (namely, the edge portion located between them).

With such a configuration, hollow portion S described above is disposed along the seat upward-downward direction (namely, the Z axis direction) at the end of seat back 3 in the seat width direction (namely, the Y axis direction), at the rear end of seat back 3 in the seat forward-rearward direction (namely, the X axis direction). Accordingly, upper arm 32 defining hollow portion S is provided with an area having a generally bent shape and high rigidity, so that a vehicle seat having higher strength can be achieved.

<First to Third Variations>

Figure 7:
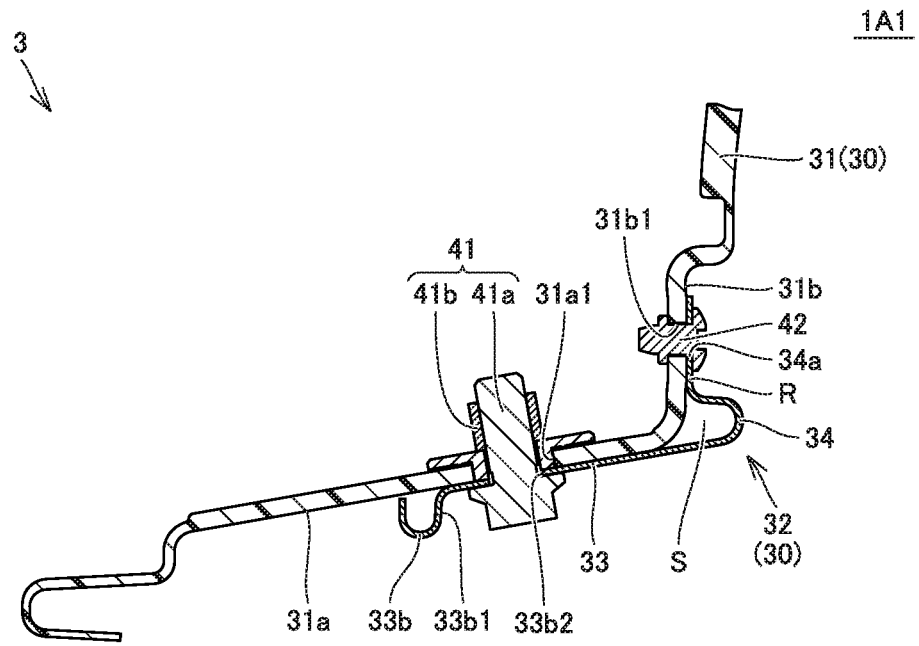
FIG. 7 is a schematic sectional view in the vicinity of the upper arm of a vehicle seat according to a first variation.
Figure 8:
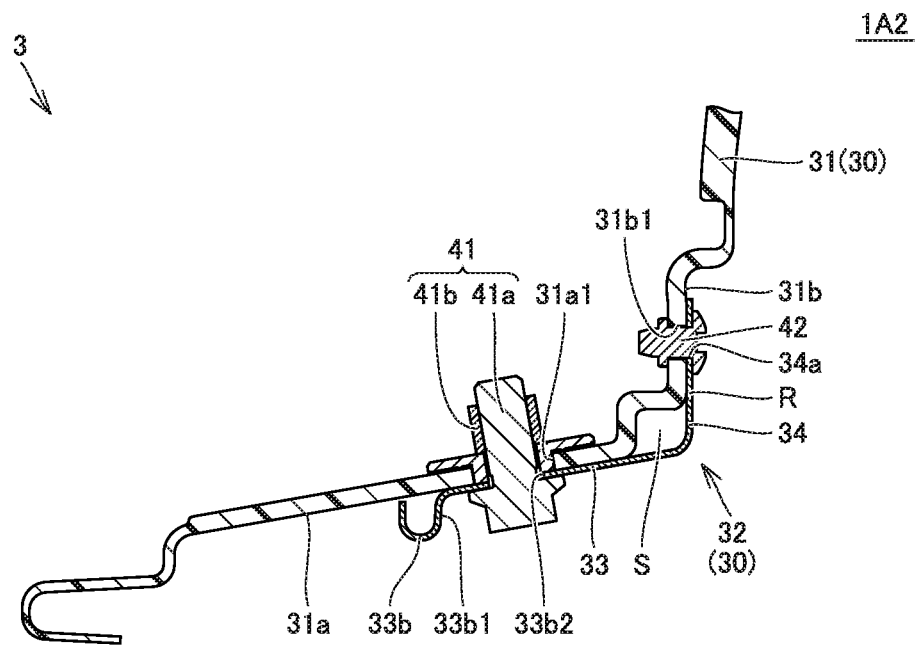
FIG. 8 is a schematic sectional view in the vicinity of the upper arm of a vehicle seat according to a second variation.
Figure 9:
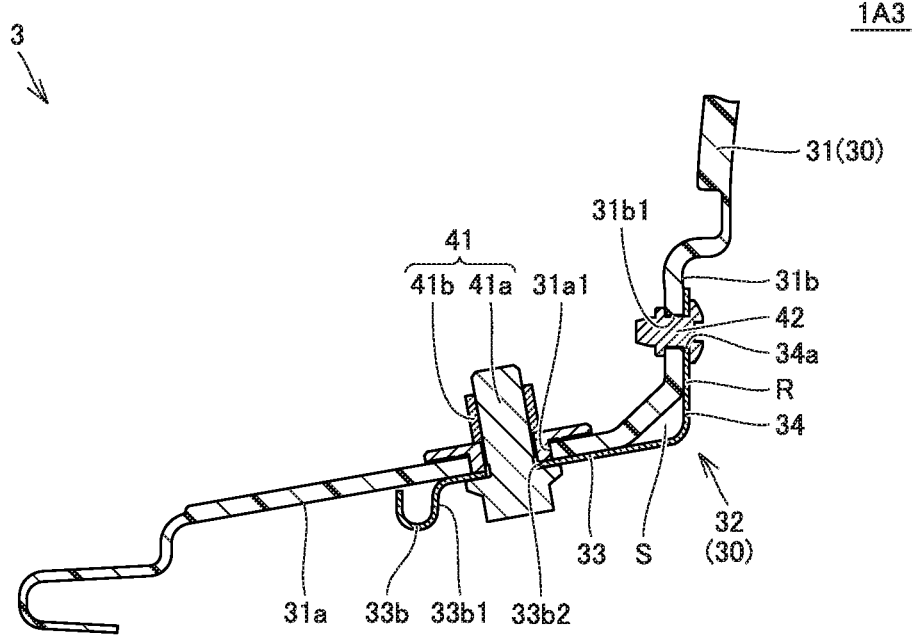
FIG. 9 is a schematic sectional view in the vicinity of the upper arm of a vehicle seat according to a third variation.

FIGS. 7 to 9 are schematic sectional views in the vicinity of the upper arm of vehicle seats according to first to third variations based on the first embodiment described above. Vehicle seats 1A1 to 1A3 according to the first to third variations are described below with reference to FIGS. 7 to 9.

As shown in FIGS. 7 to 9, vehicle seats 1A1 to 1A3 according to the first to third variations are partially different in the shape of the portion connecting side plate portion 33 and rear plate portion 34 of upper arm 32 serving as a support member, as compared to vehicle seat 1A according to the first embodiment described above. As shown in FIGS. 8 and 9, vehicle seats 1A2 and 1A3 according to the second and third variations are further partially different in the shape of the portion connecting side surface 31a and rear surface 31b of seat back shell 31, as compared to vehicle seat 1A according to the first embodiment described above.

Specifically, as shown in FIG. 7, in vehicle seat 1A1 according to the first variation, the bottom of abutment portion 33b1 provided on side plate portion 33 of upper arm 32 is provided to extend rearward in the seat forward-rearward direction (namely, the X axis direction), and is partly located to protrude more rearward than rear surface 31b of seat back shell 31.

As a result, rear plate portion 34 of upper arm 32 is provided with a rearwardly bulging portion, and in a portion on the inner side of this bulging portion, hollow portion S extending along the seat upward-downward direction (namely, the Z axis direction) is formed between seat back shell 31 and upper arm 32. Hollow portion S is located to face the portion connecting side surface 31a and rear surface 31b of seat back shell 31 (namely, the edge portion located between them).

As shown in FIG. 8, in vehicle seat 1A2 according to the second variation, the bottom of abutment portion 33b1 provided on side plate portion 33 of upper arm 32 is provided to extend rearward in the seat forward-rearward direction (namely, the X axis direction), and the portion connecting side surface 31a and rear surface 31b of seat back shell 31 is provided with an inwardly bent portion.

As a result, in a portion on the outer side of this bent portion provided on seat back shell 31, hollow portion S extending along the seat upward-downward direction (namely, the Z axis direction) is formed between seat back shell 31 and upper arm 32. Hollow portion S is located to face the portion connecting side surface 31a and rear surface 31b of seat back shell 31 (namely, the bent portion located between them).

Furthermore, as shown in FIG. 9, in vehicle seat 1A3 according to the third variation, the bottom of abutment portion 33b1 provided on side plate portion 33 of upper arm 32 is provided to extend rearward in the seat forward-rearward direction (namely, the X axis direction), and the portion connecting side surface 31a and rear surface 31b of seat back shell 31 is provided with an inclined portion.

As a result, in a portion on the outer side of this inclined portion provided on seat back shell 31, hollow portion S extending along the seat upward-downward direction (namely, the Z axis direction) is formed between seat back shell 31 and upper arm 32. Hollow portion S is located to face the portion connecting side surface 31a and rear surface 31b of seat back shell 31 (namely, the inclined portion located between them).

As shown in FIGS. 7 to 9, in vehicle seats 1A1 to 1A3 according to these first to third variations, too, the fixation of rear plate portion 34 of upper arm 32 to rear surface 31b of seat back shell 31 is at least performed in region R included in rear plate portion 34.

Thus, by employing vehicle seats 1A1 to 1A3 according to these first to third variations, too, similar effects to those described in the first embodiment can be obtained, so that a vehicle seat which is less likely to be deformed and which achieves weight reduction can be achieved. Moreover, in any of these cases, upper arm 32 or seat back shell 31 defining hollow portion S is provided with an area having a generally bent shape and high rigidity, so that a vehicle seat having higher strength can be achieved.

Second Embodiment

Figure 10:
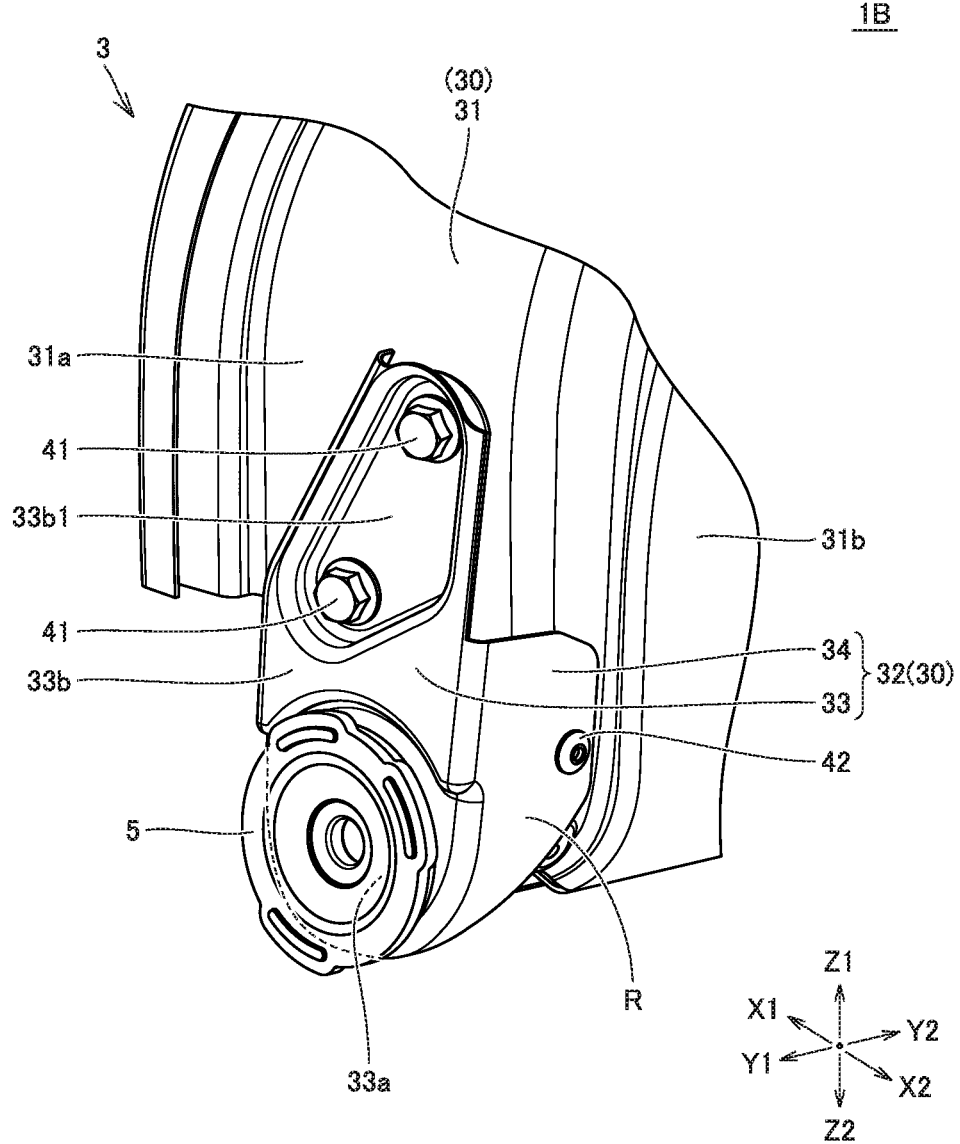
FIG. 10 is a schematic perspective view in the vicinity of the upper arm of a vehicle seat according to a second embodiment.

FIG. 10 is a schematic perspective view in the vicinity of the upper arm of a vehicle seat according to a second embodiment. A vehicle seat 1B according to the present embodiment is described below with reference to FIG. 10.

As shown in FIG. 10, vehicle seat 1B according to the present embodiment is different in the shape of upper arm 32 serving as a support member, as compared to vehicle seat 1A according to the first embodiment described above.

Specifically, in vehicle seat 1A according to the first embodiment described above, rear plate portion 34 has a configuration provided to rise from the entire rear end of side plate portion 33, whereas in vehicle seat 1B according to the present embodiment, rear plate portion 34 has a configuration provided to rise only from the lower position of the rear end of side plate portion 33. As a result, in the present embodiment, rear plate portion 34 only has region R described above. Rear plate portion 34 is not provided to rise from an upper position of the rear end of side plate portion 33, and this portion is formed as a notch.

Here, in the present embodiment, rear plate portion 34 is fixed in region R described above to rear surface 31b of seat back shell 31. More specifically, rear plate portion 34 (namely, region R) is fixed at one location in region R by second fastening member 42 formed of a rivet. This fixed position is within the range of the height positions corresponding to base portion 33a of upper arm 32 covered by recliner 5 (namely, the range indicated by symbol A1 described above (see FIG. 4)).

With such a configuration, too, the fixation of rear plate portion 34 of upper arm 32 to rear surface 31b of seat back shell 31 is performed at least in region R. Thus, the effects equivalent to those described in the first embodiment can be obtained, so that a vehicle seat which is less likely to be deformed and which achieves weight reduction can be achieved.

Other Embodiments

While the first and second embodiments as well as the first to third variations described above all illustrate configurations in which both fixations of the side plate portion and the rear plate portion of the upper arm serving as a support member to the side surface and the rear surface of the seat back shell are performed by the fastening members, the fixations may be performed by other means.

For example, the fixations may be performed using a structural adhesive, typified by a thermosetting resin such as an epoxy resin, a phenolic resin or a resorcinol resin, or the fixations may be performed by a combination of this structural adhesive and the fastening members. When the seat back shell is made of a composite resin material and a matrix resin of this composite resin material is made of a thermoplastic resin, the seat back shell and the upper arm may be integrated together through so-called insert molding during the molding of the seat back shell. Moreover, when the seat back shell is made of a metal material, it is also possible to perform the fixations by welding or friction stir welding.

In addition, while the first embodiment and the first to third variations described above illustrate configurations in which the seat back shell or the upper arm serving as a support member is provided with an area having a substantially bent shape, so that the hollow portion extending along the seat upward-downward direction is formed between them, the seat back shell or the upper arm may be provided with an area having a curved shape instead so that the hollow portion is formed.

Furthermore, while the first and second embodiments and the first to third variations described above illustrate examples where the preset disclosure is applied to a vehicle seat configured as an automobile seat, the preset disclosure can be applied to any vehicle seat, such as a seat installed in a ship, an aircraft, or a train.

A summary of contents of the present disclosure described above is given as follows.

A vehicle seat based on one aspect of the present disclosure includes: a cushion frame forming a framework of a seat cushion; a back frame forming a framework of a seat back; and a recliner configured to couple the cushion frame and the back frame in such a manner as to allow pivotal movement of the back frame. The back frame has a support member connected to the recliner, and a seat back shell supported by the support member. The support member has a side plate portion facing a side surface of the seat back shell, and a rear plate portion facing a rear surface of the seat back shell. The side plate portion has a base portion fixed to and covered by the recliner, and an extension portion provided to extend more upward than the base portion along a seat upward-downward direction. The side plate portion is fixed at the extension portion to the side surface of the seat back shell, and the rear plate portion is at least fixed in a region to the rear surface of the seat back shell, the region provided to rise inward along a seat width direction from a lower position of the side plate portion in the seat upward-downward direction.

With such a configuration, the seat back shell is supported at both the side plate portion and the rear plate portion of the support member provided to cross each other. As a result, the portion of the seat back shell that is supported by the support member functions as a strength retaining portion. In addition, the fixed position of the support member to the recliner and the fixed position of the support member to the seat back shell are disposed in proximity to each other. As a result, when an external load is applied, the distance over which the recliner and the seat back shell coupled to each other via the support member can move relative to each other can be physically reduced. Thus, a combination of these effects can lead to substantial suppression of the deformation of the support member. Therefore, the need to provide the support member with a separate reinforcing member or to increase the thickness of the support member is eliminated, so that a vehicle seat which is less likely to be deformed and which achieves weight reduction can be achieved.

In the vehicle seat based on one aspect of the present disclosure, preferably, the rear plate portion is at least fixed to the rear surface of the seat back shell at a height position in the seat upward-downward direction, the height position being equal to or lower than an uppermost position in the seat upward-downward direction of a fixed position of the extension portion to the side surface of the seat back shell.

With such a configuration, the fixed position of the support member to the recliner and the fixed position of the support member to the seat back shell are adequately close to each other, so that the deformation of the support member can be adequately suppressed when an external load is applied.

In the vehicle seat based on one aspect of the present disclosure, more preferably, the rear plate portion is at least fixed to the rear surface of the seat back shell at a height position in the seat upward-downward direction, the height position being equal to or lower than a lowermost position in the seat upward-downward direction of the fixed position of the extension portion to the side surface of the seat back shell.

With such a configuration, the fixed position of the support member to the recliner and the fixed position of the support member to the seat back shell are more adequately close to each other, so that the deformation of the support member can be more adequately suppressed when an external load is applied.

In the vehicle seat based on one aspect of the present disclosure, further preferably, the rear plate portion is at least fixed to the rear surface of the seat back shell at a height position equal to that of the base portion in the seat upward-downward direction.

With such a configuration, the fixed position of the support member to the recliner and the fixed position of the support member to the seat back shell are further adequately close to each other, so that the deformation of the support member can be further adequately suppressed when an external load is applied.

In the vehicle seat based on one aspect of the present disclosure, a hollow portion extending along the seat upward-downward direction may be provided between the seat back shell and the support member. In that case, the hollow portion is preferably located to face a portion connecting the side surface and the rear surface of the seat back shell.

With such a configuration, the hollow portion described above is disposed along the seat upward-downward direction at the end of the seat back in the seat width direction, at the rear end of the seat back in the seat forward-rearward direction. Accordingly, the seat back shell or the support member defining the hollow portion is provided with an area having a bent shape, a curved shape or the like and high rigidity, so that a vehicle seat having higher strength can be achieved.

In the vehicle seat based on one aspect of the present disclosure, the rear plate portion may be fixed to the rear surface of the seat back shell by fastening with a fastening member.

With such a configuration, a vehicle seat which is lightweight and has high strength can be implemented with a simpler configuration.

In the vehicle seat based on one aspect of the present disclosure, the extension portion may be fixed to the side surface of the seat back shell by fastening with a fastening member.

With such a configuration, a vehicle seat which is lightweight and has high strength can be implemented with a simpler configuration.

Although the present disclosure has been described and illustrated in detail, it is clearly understood that the same is by way of illustration and example only and is not to be taken by way of limitation, the scope of the present disclosure being interpreted by the terms of the appended claims.

What is claimed is:

1. A vehicle seat comprising:
   a cushion frame forming a framework of a seat cushion;
   a back frame forming a framework of a seat back; and
   a recliner configured to couple the cushion frame and the back frame in such a manner as to allow pivotal movement of the back frame,
   the back frame having a support member connected to the recliner, and a seat back shell supported by the support member,
   the support member having a side plate portion facing a side surface of the seat back shell, and a rear plate portion facing a rear surface of the seat back shell,
   the side plate portion having a base portion fixed to and covered by the recliner, and an extension portion provided to extend more upward than the base portion along a seat upward-downward direction,
   the side plate portion being fixed at the extension portion to the side surface of the seat back shell, and
   the rear plate portion being at least fixed in a region to the rear surface of the seat back shell, the region provided to rise inward along a seat width direction from a lower position of the side plate portion in the seat upward-downward direction.

2. The vehicle seat according to claim 1, wherein
   the rear plate portion is at least fixed to the rear surface of the seat back shell at a height position in the seat upward-downward direction, the height position being equal to or lower than an uppermost position in the seat upward-downward direction of a fixed position of the extension portion to the side surface of the seat back shell.

3. The vehicle seat according to claim 2, wherein
   the rear plate portion is at least fixed to the rear surface of the seat back shell at a height position in the seat upward-downward direction, the height position being equal to or lower than a lowermost position in the seat upward-downward direction of the fixed position of the extension portion to the side surface of the seat back shell.

4. The vehicle seat according to claim 1, wherein
   the rear plate portion is at least fixed to the rear surface of the seat back shell at a height position equal to that of the base portion in the seat upward-downward direction.

5. The vehicle seat according to claim 1, wherein
   a hollow portion extending along the seat upward-downward direction is provided between the seat back shell and the support member, and
   the hollow portion is located to face a portion connecting the side surface and the rear surface of the seat back shell.

6. The vehicle seat according to claim 1, wherein
   the rear plate portion is fixed to the rear surface of the seat back shell by fastening with a fastening member.

7. The vehicle seat according to claim 1, wherein
   the extension portion is fixed to the side surface of the seat back shell by fastening with a fastening member.

* * * * *